United States Patent
Grave et al.

(10) Patent No.: US 10,046,251 B2
(45) Date of Patent: Aug. 14, 2018

(54) LIQUID COLLECTION SYSTEM

(71) Applicants: Edward J. Grave, Montogmery, TX (US); Nicholas F. Urbanski, Katy, TX (US)

(72) Inventors: Edward J. Grave, Montogmery, TX (US); Nicholas F. Urbanski, Katy, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 339 days.

(21) Appl. No.: 14/853,319

(22) Filed: Sep. 14, 2015

(65) Prior Publication Data

US 2016/0138864 A1 May 19, 2016

Related U.S. Application Data

(60) Provisional application No. 62/080,452, filed on Nov. 17, 2014.

(51) Int. Cl.
*B01D 3/20* (2006.01)
*B01D 3/32* (2006.01)
(Continued)

(52) U.S. Cl.
CPC .............. *B01D 3/20* (2013.01); *B01D 3/22* (2013.01); *B01D 3/324* (2013.01); *B01D 3/326* (2013.01); *B01D 3/4261* (2013.01); *F25J 3/0209* (2013.01); *F25J 3/0219* (2013.01); *F25J 3/0233* (2013.01); *F25J 3/0266* (2013.01); *F25J 3/0295* (2013.01);
(Continued)

(58) Field of Classification Search
CPC . B01D 3/20; B01D 3/205; B01D 3/22; B01D 3/324; B01D 3/326; B01D 3/4261; F25J 3/0209; F25J 3/0219; F25J 3/0295
See application file for complete search history.

(56) References Cited

U.S. PATENT DOCUMENTS

| 1,782,862 A | 11/1930 | Wagner |
| 2,384,714 A | 2/1944 | Villiger .................. 257/224 |

(Continued)

FOREIGN PATENT DOCUMENTS

| CA | 1169002 | 6/1984 | .................. 196/29 |
| EP | 0525287 | 2/1993 | .............. B65G 5/00 |

(Continued)

OTHER PUBLICATIONS

Chuang, K. T. et al. (2000) "Tray Columns: Design," *Academic Press*, pp. 1135-1140. http://razifar.com/cariboost_files/Tray_20Columns_20Design.pdf.

(Continued)

*Primary Examiner* — Renee Robinson
(74) *Attorney, Agent, or Firm* — ExxonMobil Upstream Research Company Law Department

(57) ABSTRACT

An apparatus is disclosed for maintaining constant fluid pressure and equalized fluid flow among a plurality of downcomer lines through which liquid from a tower is directed. A substantially annular fluid distribution belt is disposed at the circumference of the tower. The fluid distribution belt collects liquid from the tower. At least two outlets direct liquid from the fluid distribution belt out of the tower and into a corresponding number of downcomer lines disposed external to the tower.

18 Claims, 9 Drawing Sheets

(51) Int. Cl.
*F25J 3/02* (2006.01)
*B01D 3/22* (2006.01)
*B01D 3/42* (2006.01)

(52) U.S. Cl.
CPC ........ *F25J 2200/02* (2013.01); *F25J 2200/30* (2013.01); *F25J 2200/50* (2013.01); *F25J 2200/74* (2013.01); *F25J 2200/76* (2013.01); *F25J 2200/90* (2013.01); *F25J 2205/04* (2013.01); *F25J 2205/20* (2013.01); *F25J 2270/90* (2013.01); *F25J 2280/02* (2013.01); *F25J 2280/40* (2013.01); *Y02C 10/12* (2013.01)

(56) References Cited

U.S. PATENT DOCUMENTS

| | | | |
|---|---|---|---|
| 2,651,512 A | 9/1953 | Voleau | |
| 3,066,732 A | 12/1962 | McEver | 166/7 |
| 3,338,566 A | 8/1967 | Kittel | |
| 3,412,016 A | 11/1968 | Graven | |
| 3,438,203 A | 4/1969 | Lamb et al. | 61/0.5 |
| 3,768,726 A | 10/1973 | Hale et al. | 233/16 |
| 3,807,501 A | 4/1974 | Kurtis et al. | 166/314 |
| 4,016,930 A | 4/1977 | Arnold | 166/266 |
| 4,129,626 A | 12/1978 | Mellbom | 261/114 |
| 4,187,088 A | 2/1980 | Hodgson | 55/169 |
| 4,230,533 A | 10/1980 | Giroux | |
| 4,365,978 A | 12/1982 | Scott | 55/47 |
| 4,661,127 A | 4/1987 | Huntley | 55/174 |
| 4,669,530 A | 6/1987 | Warner | 165/1 |
| 4,691,524 A | 9/1987 | Holscher | 60/652 |
| 4,699,211 A | 10/1987 | Geary et al. | 165/159 |
| 4,719,008 A | 1/1988 | Sparks et al. | 208/390 |
| 4,737,531 A | 4/1988 | Rogers | 423/450 |
| 5,092,038 A | 3/1992 | Geppelt et al. | 29/890.048 |
| 5,129,759 A | 7/1992 | Bishop | 405/59 |
| 5,302,294 A | 4/1994 | Schubert et al. | 210/702 |
| 5,394,943 A | 3/1995 | Harrington | 166/373 |
| 5,407,605 A | 4/1995 | Resetarits et al. | 261/98 |
| 5,451,349 A | 9/1995 | Kingsley | 261/91 |
| 5,752,538 A | 5/1998 | Billingham et al. | 137/1 |
| 5,803,161 A | 9/1998 | Wahle et al. | 165/104.21 |
| 5,857,519 A | 1/1999 | Bowlin et al. | 166/105.6 |
| 5,984,282 A | 11/1999 | Armstrong et al. | 261/112.2 |
| 6,053,484 A | 4/2000 | Fan et al. | 261/114.1 |
| 6,086,055 A | 7/2000 | Armstrong et al. | 261/96 |
| 6,092,377 A | 7/2000 | Tso | 62/173 |
| 6,149,136 A | 11/2000 | Armstrong et al. | 261/19 |
| 6,190,543 B1 | 2/2001 | Christiansen | 210/87 |
| 6,197,095 B1 | 3/2001 | Ditria et al. | 95/243 |
| 6,245,955 B1 | 6/2001 | Smith | 585/15 |
| 6,260,619 B1 | 7/2001 | Svedeman et al. | 166/265 |
| 6,367,547 B1 | 4/2002 | Towers et al. | 166/265 |
| 6,397,630 B1 | 6/2002 | Fraysse et al. | 62/643 |
| 6,564,865 B1 | 5/2003 | Brady et al. | 166/105.3 |
| 6,755,158 B2 | 6/2004 | Knecht et al. | 123/41.56 |
| 6,820,696 B2 | 11/2004 | Bergman et al. | 166/369 |
| 6,827,138 B1 | 12/2004 | Master et al. | 165/159 |
| 6,984,292 B2 | 1/2006 | Kresnyak et al. | 203/1 |
| 7,051,540 B2 | 5/2006 | TeGrotenhuis et al. | 62/93 |
| 7,140,441 B2 | 11/2006 | Hauge et al. | 166/357 |
| 7,156,579 B2 | 1/2007 | Castle et al. | 405/58 |
| 7,322,387 B2 | 1/2008 | Landry et al. | 141/382 |
| 7,363,982 B2 | 4/2008 | Hopper | 166/357 |
| 7,490,671 B2 | 2/2009 | Gramme et al. | 166/357 |
| 7,516,794 B2 | 4/2009 | Gramme et al. | 166/357 |
| 7,540,902 B2 | 6/2009 | Esparza et al. | 95/243 |
| 7,554,223 B1 | 6/2009 | Kay | 310/11 |
| 7,611,635 B2 | 11/2009 | Chieng et al. | 210/744 |
| 7,730,942 B2 | 6/2010 | Gramme et al. | 166/245 |
| 7,823,628 B2 | 11/2010 | Harrison | 165/95 |
| 7,854,849 B2 | 12/2010 | Wang et al. | 210/744 |
| 7,918,283 B2 | 4/2011 | Balkanyi et al. | 166/344 |
| 7,985,333 B2 | 7/2011 | Duyvesteyn | 208/390 |
| 8,025,341 B2 | 9/2011 | Bjornson et al. | 299/18 |
| 8,136,799 B2 | 3/2012 | Griepsma | 261/114.5 |
| 8,220,551 B2 | 7/2012 | Fenton | 166/357 |
| 8,225,852 B2 | 7/2012 | Wu et al. | 165/140 |
| 8,273,151 B2 | 9/2012 | Miotto et al. | 95/24 |
| 8,282,711 B2 | 10/2012 | Grenstad et al. | 95/253 |
| 8,454,843 B2 | 6/2013 | Brown et al. | 210/803 |
| 8,470,097 B2 | 6/2013 | Chun et al. | 148/240 |
| 8,500,105 B2 | 8/2013 | Nieuwoudt | 261/79.2 |
| 8,613,308 B2 | 12/2013 | Daly et al. | 165/163 |
| 8,657,897 B2 | 2/2014 | Kayat et al. | 55/337 |
| 8,657,940 B2 | 2/2014 | Aarebrot et al. | 96/188 |
| 8,778,159 B2 | 7/2014 | Liverud et al. | 204/563 |
| 2004/0020238 A1 | 2/2004 | Kalbassi et al. | 62/617 |
| 2004/0109538 A1 | 6/2004 | McCarthy, Jr. | 378/141 |
| 2004/0195707 A1 | 10/2004 | Ender et al. | |
| 2005/0006086 A1 | 1/2005 | Gramme | 166/105.5 |
| 2008/0017594 A1 | 1/2008 | Sarshar et al. | 210/787 |
| 2008/0272059 A1 | 11/2008 | Chieng et al. | 210/744 |
| 2009/0013697 A1 | 1/2009 | Landry et al. | 62/53.1 |
| 2009/0049864 A1* | 2/2009 | Kovak | B01D 3/008 62/643 |
| 2009/0139938 A1 | 6/2009 | Larnholm et al. | 210/788 |
| 2009/0151914 A1 | 6/2009 | Mostofi-Ashtiani | 165/158 |
| 2009/0242490 A1 | 10/2009 | Hopper | 210/723 |
| 2009/0301699 A1 | 12/2009 | Karrs et al. | 165/159 |
| 2009/0309408 A1 | 12/2009 | Bishop | 299/5 |
| 2009/0314483 A1 | 12/2009 | Kalbacher | 165/185 |
| 2010/0012325 A1 | 1/2010 | Friedemann | 166/335 |
| 2010/0032164 A1 | 2/2010 | Bakke | 166/366 |
| 2010/0180769 A1 | 7/2010 | Grenstad et al. | 95/260 |
| 2010/0243208 A1 | 9/2010 | Kar et al. | 165/96 |
| 2010/0252227 A1 | 10/2010 | Sten-Halvorsen et al. | 165/45 |
| 2010/0276821 A1 | 11/2010 | Lee et al. | 261/79.1 |
| 2010/0326922 A1 | 12/2010 | Varanasi et al. | 210/708 |
| 2011/0067742 A1 | 3/2011 | Bell et al. | 136/204 |
| 2011/0072975 A1 | 3/2011 | Aarebrot et al. | 96/157 |
| 2011/0100589 A1 | 5/2011 | Van Der Rest | 165/45 |
| 2011/0167865 A1 | 7/2011 | Morimoto et al. | 62/513 |
| 2011/0209446 A1 | 9/2011 | Kayat et al. | 55/322 |
| 2012/0091711 A1 | 4/2012 | Badger | 290/43 |
| 2012/0145653 A1 | 6/2012 | Van Der Merwe et al. | 210/800 |
| 2012/0160103 A1 | 6/2012 | Suppiah et al. | 95/249 |
| 2013/0001136 A1 | 1/2013 | Adeyinka et al. | 208/390 |
| 2013/0092633 A1 | 4/2013 | Abrand et al. | 210/747.6 |
| 2013/0206364 A1 | 8/2013 | Fehrenbach et al. | 165/104.11 |
| 2013/0206405 A1 | 8/2013 | Kift et al. | 166/268 |
| 2013/0220891 A1 | 8/2013 | Newman et al. | 208/390 |

FOREIGN PATENT DOCUMENTS

| | | | |
|---|---|---|---|
| EP | 2 826 532 | 1/2015 | |
| GB | 1010403 | 11/1965 | |
| RU | 2451251 | 5/2012 | F25J 3/00 |
| WO | WO2000/036270 | 6/2000 | E21B 43/20 |
| WO | WO2003/091133 | 11/2003 | E21B 43/28 |
| WO | WO2004/007908 | 1/2004 | E21B 43/34 |
| WO | WO2006/010765 | 2/2006 | B01D 19/00 |
| WO | WO2010/110676 | 9/2010 | E21B 37/00 |
| WO | WO2010/117265 | 10/2010 | E21B 43/34 |
| WO | WO 2010/151392 | 12/2010 | E21B 43/34 |
| WO | WO2013/043354 | 3/2013 | C10G 1/04 |
| WO | WO2013/103448 | 7/2013 | E21F 17/16 |
| WO | WO 2014/015418 | 1/2014 | B05D 1/32 |
| WO | WO2014/018148 | 1/2014 | B01D 45/00 |
| WO | WO2014/058480 | 4/2014 | E21B 43/36 |
| WO | WO2014/070352 | 5/2014 | B01D 3/14 |

OTHER PUBLICATIONS

Eriksen, H. (2010) "Development of Calculation Model for Heat Exchangers in Subsea Systems," *Norwegian Univ. of Sci. and Tech.*, 124 pgs.

Hannisdal, A. et al. (2012) "Compact Separation Technologies and their Applicability for Subsea Development in Deep Water," *OTC Paper* 23223, Apr. 30-May 3, 2012, 12 pgs. http://asme-ipti.org/files/1841/.

(56) References Cited

OTHER PUBLICATIONS

Sinker, A. et al. (1997) "Applying the Compact Separation Methodology to Heavy Oil Separation," *Krebs Petroleum Tech. Ltd.*, Sep. 29-30, 1997, Aberdeen, UK, 17 pgs.

Sparks, B.D. et al. (1992), "The effect of asphaltene content on solvent selection for bitumen extraction by the SESA process," *Fuel* 71, pp. 1349-1353.

* cited by examiner

LIQUID COLLECTION SYSTEM

CROSS-REFERENCE TO RELATED APPLICATION

This application claims the benefit of U.S. Provisional Patent Application 62/080,452, filed Nov. 17, 2014, entitled LIQUID COLLECTION SYSTEM, the entirety of which is incorporated by reference herein.

BACKGROUND

Fields of Disclosure

The disclosure relates generally to the field of fluid separation. More specifically, the disclosure relates to the cryogenic separation of contaminants, such as acid gas, from a hydrocarbon.

Description of Related Art

This section is intended to introduce various aspects of the art, which may be associated with the present disclosure. This discussion is intended to provide a framework to facilitate a better understanding of particular aspects of the present disclosure. Accordingly, it should be understood that this section should be read in this light, and not necessarily as admissions of prior art.

The production of natural gas hydrocarbons, such as methane and ethane, from a reservoir oftentimes carries with it the incidental production of non-hydrocarbon gases. Such gases include contaminants, such as at least one of carbon dioxide ("$CO_2$"), hydrogen sulfide ("$H_2S$"), carbonyl sulfide, carbon disulfide and various mercaptans. When a feed stream being produced from a reservoir includes these contaminants mixed with hydrocarbons, the stream is oftentimes referred to as "sour gas."

Many natural gas reservoirs have relatively low percentages of hydrocarbons and relatively high percentages of contaminants. Contaminants may act as a diluent and lower the heat content of hydrocarbons. Some contaminants, like sulfur-bearing compounds, are noxious and may even be lethal. Additionally, in the presence of water some contaminants can become quite corrosive.

It is desirable to remove contaminants from a stream containing hydrocarbons to produce sweet and concentrated hydrocarbons. Specifications for pipeline quality natural gas typically call for a maximum of 2-4% $CO_2$ and ¼ grain $H_2S$ per 100 scf (4 ppmv) or 5 mg/Nm3 $H_2S$. Specifications for lower temperature processes such as natural gas liquefaction plants or nitrogen rejection units typically require less than 50 ppm $CO_2$.

The separation of contaminants from hydrocarbons is difficult and consequently significant work has been applied to the development of hydrocarbon/contaminant separation methods. These methods can be placed into three general classes: absorption by solvents (physical, chemical and hybrids), adsorption by solids, and distillation.

Separation by distillation of some mixtures can be relatively simple and, as such, is widely used in the natural gas industry. However, distillation of mixtures of natural gas hydrocarbons, primarily methane, and one of the most common contaminants in natural gas, carbon dioxide, can present significant difficulties. Conventional distillation principles and conventional distillation equipment are predicated on the presence of only vapor and liquid phases throughout the distillation tower. The separation of $CO_2$ from methane by distillation involves temperature and pressure conditions that result in solidification of $CO_2$ if a pipeline or better quality hydrocarbon product is desired. The required temperatures are cold temperatures typically referred to as cryogenic temperatures.

Certain cryogenic distillations can overcome the above mentioned difficulties. These cryogenic distillations provide the appropriate mechanism to handle the formation and subsequent melting of solids during the separation of solid-forming contaminants from hydrocarbons. The formation of solid contaminants in equilibrium with vapor-liquid mixtures of hydrocarbons and contaminants at particular conditions of temperature and pressure takes place in a controlled freeze zone section.

Some cryogenic distillation methods include a process to collect a liquid stream in a tray, heat the liquid stream to form a vapor, and re-introduce the vapor into the distillation process. FIGS. 1 and 2 show a portion of a fractionation column 1 designed to perform such a process. A heated vapor stream is introduced into the column 1 via inlets 2. The vapor rises through risers or chimneys 3 and heats other portions of the cryogenic distillation process. Cooled vapor descends as liquid between chimneys 3 and falls on a draw tray deck, otherwise known as a chimney tray 4. All or part of the liquid may be collected. Liquid on the chimney tray 4 is directed to a centralized collection trough 5 that equalizes the flow of the collected liquid to a collection sump(s) 6 through outlet nozzles 7 that are cut into the wall 8 of the fractionation column 1 Outlet nozzles allow the liquid to transfer from the sump(s) 6 to the downcomer piping 9 and thereby exit the fractionation column 1

Conventional design practice limits the chimney tray 4 to accommodate either one or two outlet nozzles 7 through which the collected liquid passes out of the column and into the downcomer piping. If two outlet nozzles 7 are used, the outlet nozzles almost always are oriented at 180 degrees from each other, as shown in FIGS. 1 and 2. The outlet nozzles 7 may be positioned several feet above ground to provide a liquid static head, or pressure, in the downcomer piping 9 for required pump performance and/or desired heat exchanger operation. However, a constant head in the downcomer piping may not be possible if more than two outlet nozzles are used. Additionally, as sump extends into the fractionation column 1, the available diameter for fluid and vapor flow inside the fractionation column is reduced.

A need exists for improved technology that permits more than two outlet nozzles to be employed in a chimney tray assembly.

A need also exists for improved technology that reduces or eliminates the constriction or reduced diameter for fluid and/or vapor flow in a fractionation column due to a sump.

SUMMARY

The present disclosure provides an improved chimney tray assembly for use in a fractionation column.

In one aspect, an apparatus is disclosed for maintaining constant fluid pressure and equalized fluid flow among a plurality of downcomer lines through which liquid from a substantially cylindrical tower is directed. A substantially annular fluid distribution belt is disposed at the circumference of the tower. The fluid distribution belt collects liquid from the tower. At least two outlets direct liquid from the fluid distribution belt out of the tower and into a corresponding number of downcomer lines disposed external to the tower.

In another aspect, a method is disclosed for maintaining constant fluid pressure and equalized fluid flow among a plurality of downcomer lines through which liquid from a substantially cylindrical tower is directed. A substantially annular fluid distribution belt is disposed at the circumference of the tower. Liquid from the tower is collected in the fluid distribution belt. The liquid is directed from the fluid distribution belt out of the tower and into a corresponding number of downcomer lines disposed external to the tower.

In another aspect, a method of producing hydrocarbons is disclosed. Constant fluid pressure and equalized fluid flow is maintained among a plurality of downcomer lines through which liquid from a substantially cylindrical tower is directed. A substantially annular fluid distribution belt is disposed at the circumference of the tower. Liquid from the tower is collected in the fluid distribution belt. Liquid is directed from the fluid distribution belt out of the tower and into a corresponding number of downcomer lines disposed external to the tower. Hydrocarbons from the tower are produced.

The foregoing has broadly outlined the features of the present disclosure so that the detailed description that follows may be better understood. Additional features will also be described herein.

BRIEF DESCRIPTION OF THE DRAWINGS

These and other features, aspects and advantages of the disclosure will become apparent from the following description, appending claims and the accompanying drawings, which are briefly described below.

Figure 1:
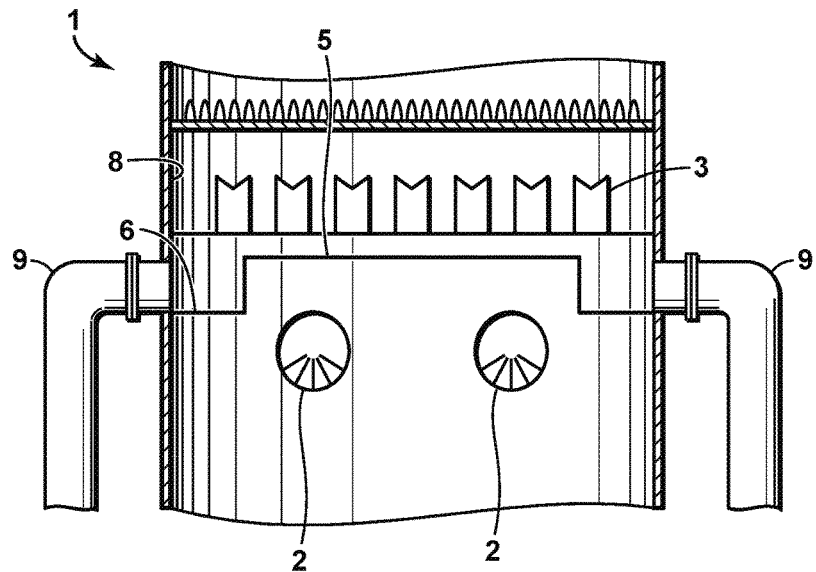
FIG. 1 is a side elevational view of a portion of a distillation column or tower.
Figure 2:
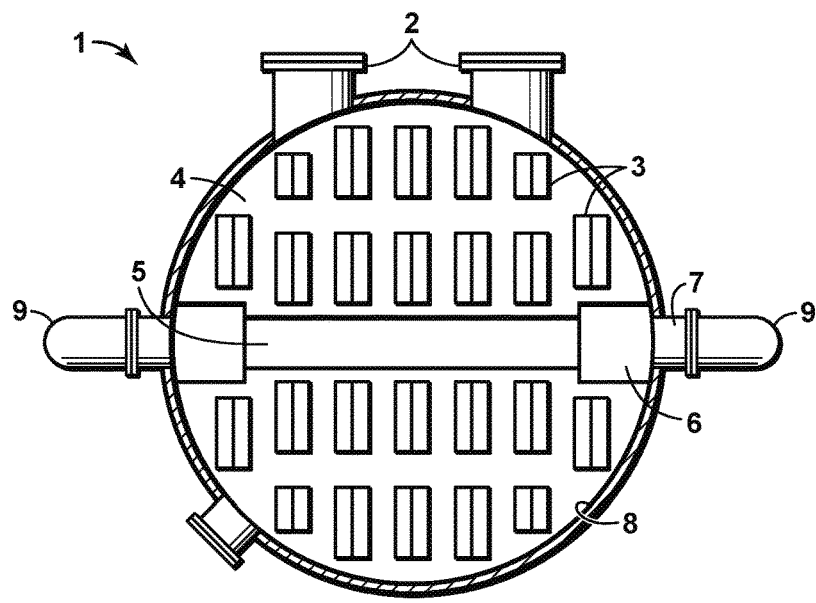
FIG. 2 is a top plan view of the portion shown in FIG. 1.

It should be noted that the figures are merely examples and no limitations on the scope of the present disclosure are intended thereby. Further, the figures are generally not drawn to scale, but are drafted for purposes of convenience and clarity in illustrating various aspects of the disclosure.

DETAILED DESCRIPTION

For the purpose of promoting an understanding of the principles of the disclosure, reference will now be made to the features illustrated in the drawings and specific language will be used to describe the same. It will nevertheless be understood that no limitation of the scope of the disclosure is thereby intended. Any alterations and further modifications, and any further applications of the principles of the disclosure as described herein are contemplated as would normally occur to one skilled in the art to which the disclosure relates. It will be apparent to those skilled in the relevant art that some features that are not relevant to the present disclosure may not be shown in the drawings for the sake of clarity.

As referenced in this application, the terms "stream," "gas stream," "vapor stream," and "liquid stream" refer to different stages of a feed stream as the feed stream is processed in a distillation tower that separates methane, the primary hydrocarbon in natural gas, from contaminants. Although the phrases "gas stream," "vapor stream," and "liquid stream," refer to situations where a gas, vapor, and liquid is mainly present in the stream, respectively, there may be other phases also present within the stream. For example, a gas may also be present in a "liquid stream." In some instances, the terms "gas stream" and "vapor stream" may be used interchangeably.

The disclosure relates to a system and method for maintaining constant fluid pressure and equalized fluid flow among a plurality of downcomer lines through which liquid from a substantially cylindrical tower is directed. FIGS. 3-16 of the disclosure display various aspects of the system and method. The disclosure demonstrates how such system and method may be used beneficially in an application in a hydrocarbon distillation tower, and specifically in a distillation tower implementing a controlled freeze zone method as disclosed herein. However, it is to be understood that the system and method of the disclosure may be used in other types of towers where maintaining constant fluid pressure and and equalized fluid flow is desired.

The system and method may separate a feed stream having methane and contaminants. The system may comprise a distillation tower 104, 204 (FIGS. 3-6). The distillation tower 104, 204 may separate the contaminants from the methane.

The distillation tower 104, 204 may be separated into three functional sections: a lower section 106, a middle controlled freeze zone section 108 and an upper section 110. The distillation tower 104, 204 may incorporate three functional sections when the upper section 110 is needed and/or desired.

The distillation tower 104, 204 may incorporate only two functional sections when the upper section 110 is not needed and/or desired. When the distillation tower does not include an upper section 110, a portion of vapor leaving the middle controlled freeze zone section 108 may be condensed in a condenser 122 and returned as a liquid stream via a spray assembly 129. Moreover, lines 18 and 20 may be eliminated, elements 124 and 126 may be one and the same, and elements 150 and 128 may be one and the same. The stream in line 14, now taking the vapors leaving the middle controlled freeze section 108, directs these vapors to the condenser 122.

The lower section 106 may also be referred to as a stripper section. The middle controlled freeze zone section 108 may also be referred to as a controlled freeze zone section. The upper section 110 may also be referred to as a rectifier section.

Figure 3:
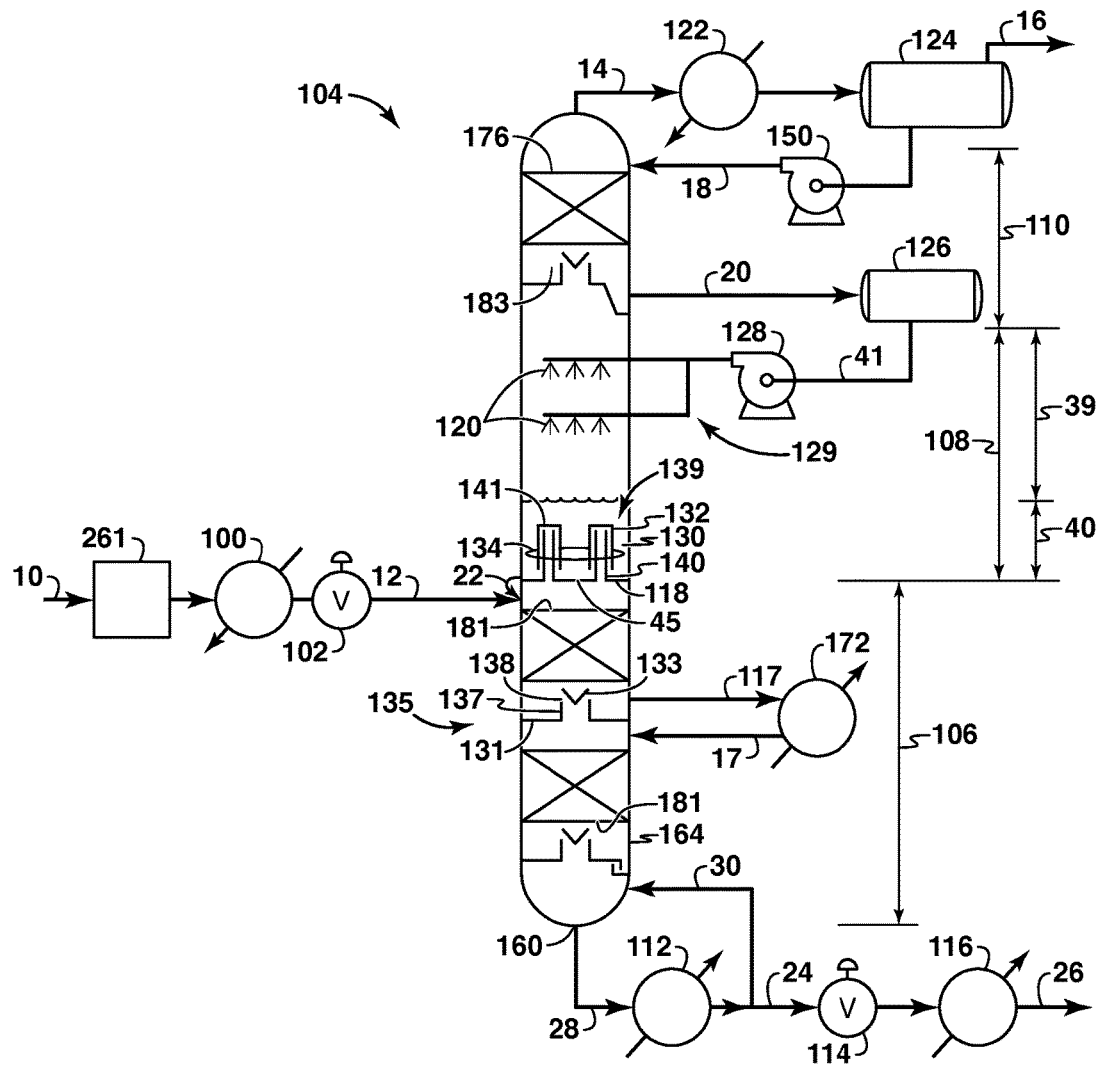
FIG. 3 is a schematic diagram of a tower with sections within a single vessel.
Figure 5:
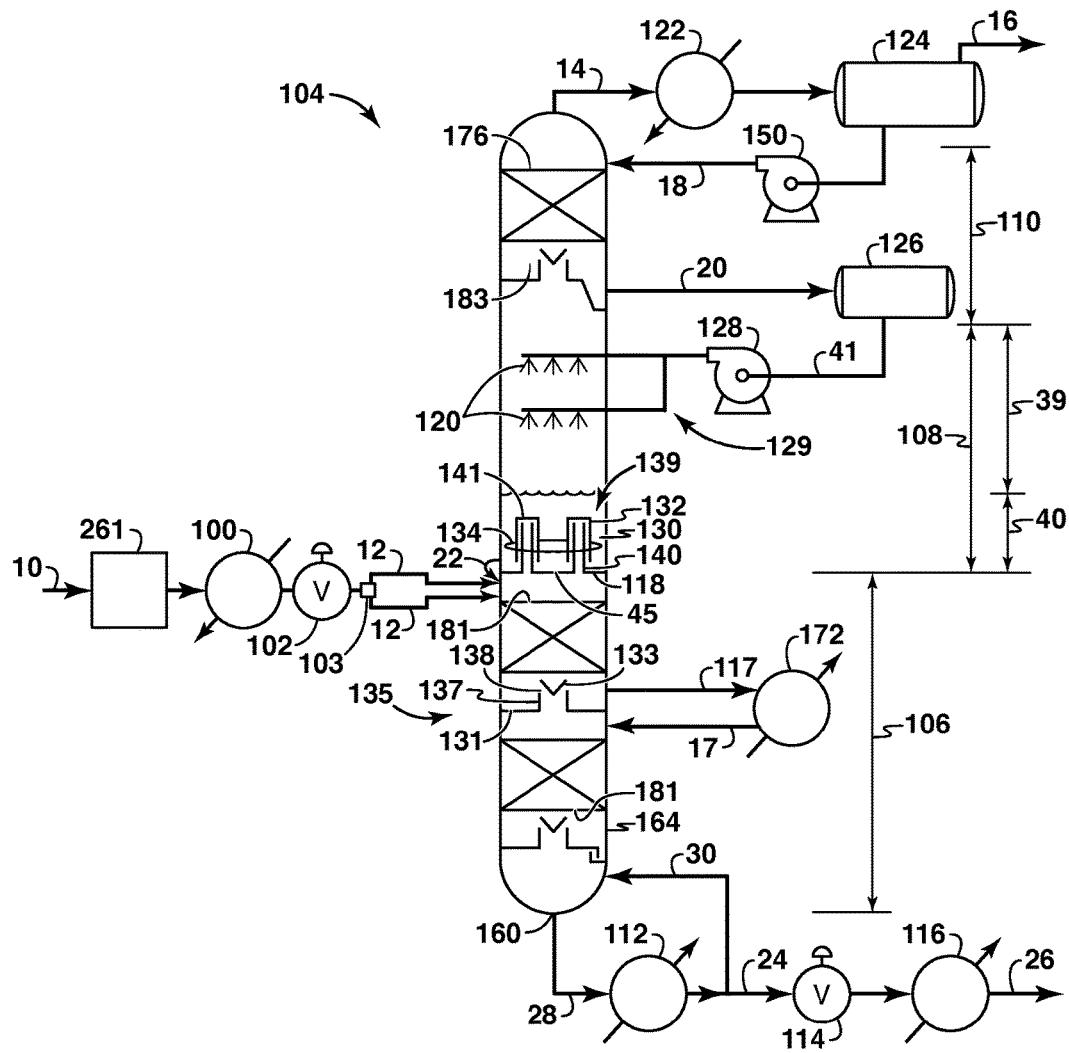
FIG. 5 is a schematic diagram of a tower with sections within a single vessel.

The sections of the distillation tower 104 may be housed within a single vessel (FIGS. 3 and 5). For example, the lower section 106, the middle controlled freeze zone section 108, and the upper section 110 may be housed within a single vessel 164.

Figure 4:
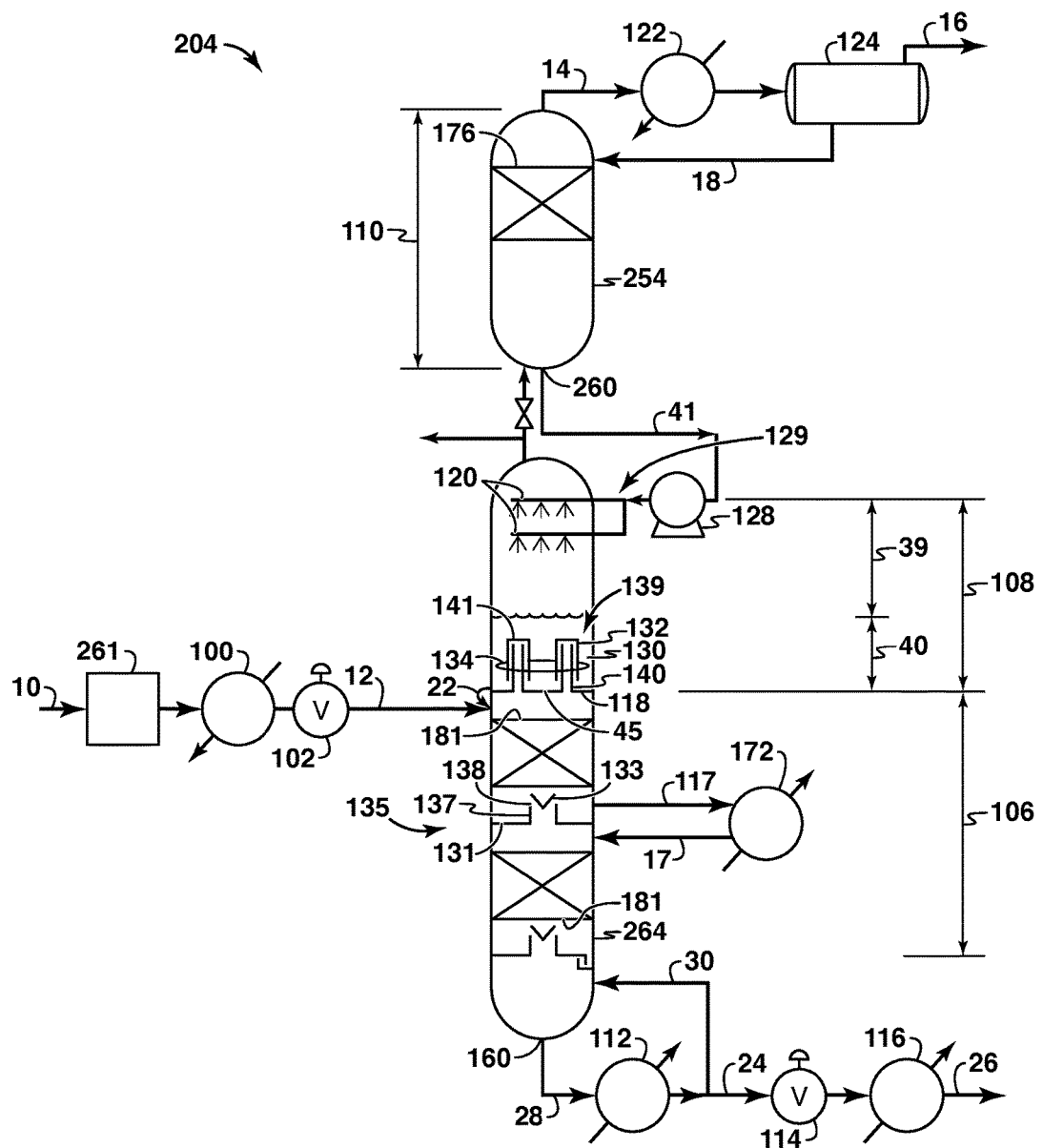
FIG. 4 is a schematic diagram of a tower with sections within multiple vessels.
Figure 6:
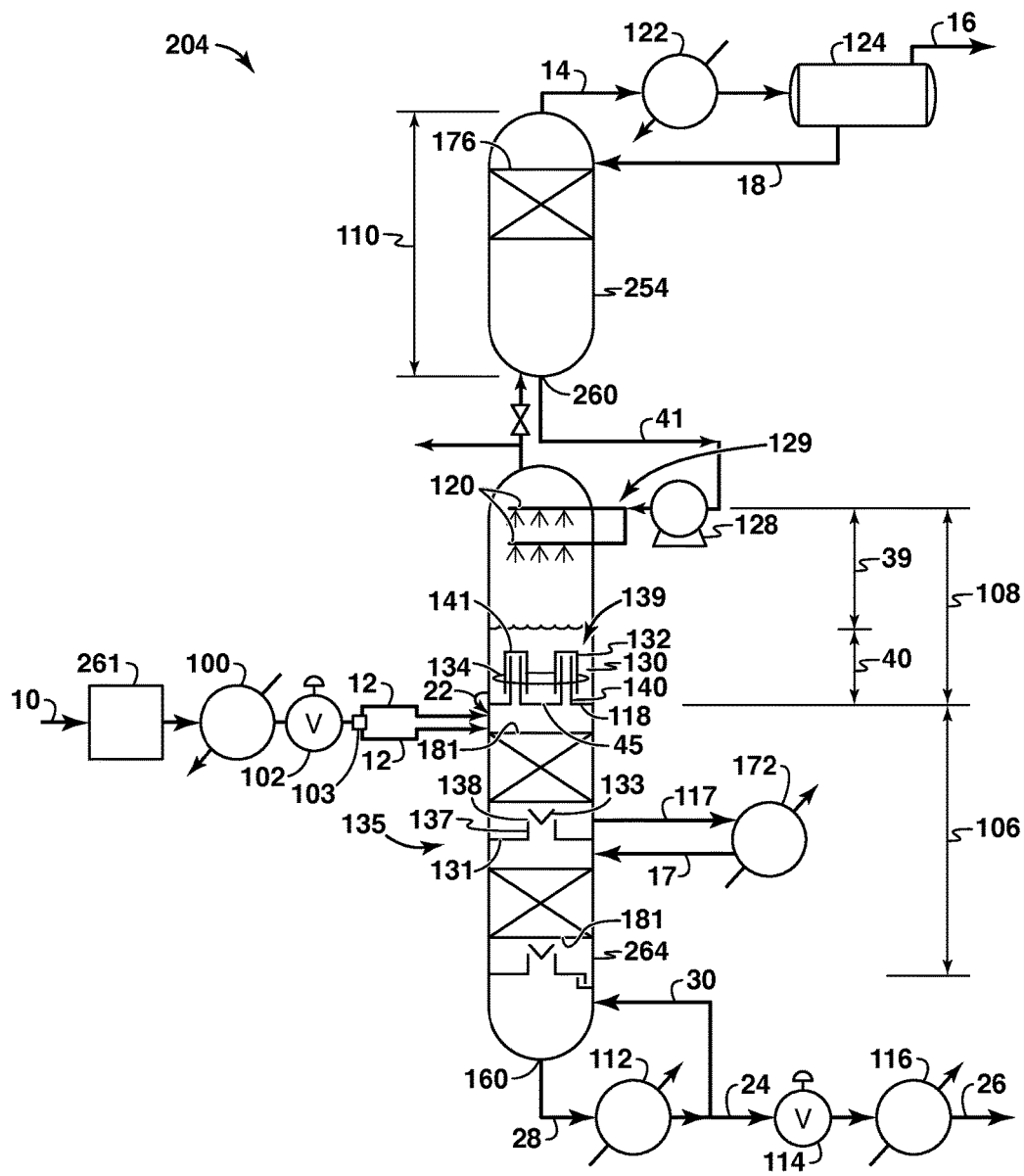
FIG. 6 is a schematic diagram of a tower with sections within multiple vessels.

The sections of the distillation tower 204 may be housed within a plurality of vessels to form a split-tower configuration (FIGS. 4 and 6). Each of the vessels may be separate from the other vessels. Piping and/or another suitable mechanism may connect one vessel to another vessel. In this instance, the lower section 106, middle controlled freeze zone section 108 and upper section 110 may be housed within two or more vessels. For example, as shown in FIGS. 4 and 6, the upper section 110 may be housed within a single vessel 254 and the lower and middle controlled freeze zone sections 106, 108 may be housed within a single vessel 264. When this is the case, a liquid stream exiting the upper section 110, may exit through a liquid outlet bottom 260. The liquid outlet bottom 260 is at the bottom of the upper section 110. Although not shown, each of the sections may be housed within its own separate vessel, or one or more section may be housed within separate vessels, or the upper and middle controlled freeze zone sections may be housed within a single vessel and the lower section may be housed within a single vessel, etc. When sections of the distillation tower are housed within vessels, the vessels may be side-by-side along a horizontal line and/or above each other along a vertical line.

The split-tower configuration may be beneficial in situations where the height of the distillation tower, motion considerations, and/or transportation issues, such as for remote locations, need to be considered. This split-tower configuration allows for the independent operation of one or more sections. For example, when the upper section is housed within a single vessel and the lower and middle controlled freeze zone sections are housed within a single vessel, independent generation of reflux liquids using a substantially contaminant-free, largely hydrocarbon stream from a packed gas pipeline or an adjacent hydrocarbon line, may occur in the upper section. And the reflux may be used to cool the upper section, establish an appropriate temperature profile in the upper section, and/or build up liquid inventory at the bottom of the upper section to serve as an initial source of spray liquids for the middle controlled freeze zone section. Moreover, the middle controlled freeze zone and lower sections may be independently prepared by chilling the feed stream, feeding it to the optimal location be that in the lower section or in the middle controlled freeze zone section, generating liquids for the lower and the middle controlled freeze zone sections, and disposing the vapors off the middle controlled freeze zone section while they are off specification with too high a contaminant content. Also, liquid from the upper section may be intermittently or continuously sprayed, building up liquid level in the bottom of the middle controlled freeze zone section and bringing the contaminant content in the middle controlled freeze zone section down and near steady state level so that the two vessels may be connected to send the vapor stream from the middle controlled freeze zone section to the upper section, continuously spraying liquid from the bottom of the upper section into the middle controlled freeze zone section and stabilizing operations into steady state conditions. The split tower configuration may utilize a sump of the upper section as a liquid receiver for the pump 128, therefore obviating the need for a liquid receiver 126 in FIGS. 3 and 5.

The system may also include a heat exchanger 100 (FIGS. 3-6). The feed stream 10 may enter the heat exchanger 100 before entering the distillation tower 104, 204. The feed stream 10 may be cooled within the heat exchanger 100. The heat exchanger 100 helps drop the temperature of the feed stream 10 to a level suitable for introduction into the distillation tower 104, 204.

The system may include an expander device 102 (FIGS. 3-6). The feed stream 10 may enter the expander device 102 before entering the distillation tower 104, 204. The feed stream 10 may be expanded in the expander device 102 after exiting the heat exchanger 100. The expander device 102 helps drop the temperature of the feed stream 10 to a level suitable for introduction into the distillation tower 104, 204. The expander device 102 may be any suitable device, such as a valve. If the expander device 102 is a valve, the valve may be any suitable valve that may aid in cooling the feed stream 10 before it enters the distillation tower 104, 204. For example, the valve 102 may comprise a Joule-Thompson (J-T) valve.

The system may include a feed separator 103 (FIGS. 5-6). The feed stream may enter the feed separator before entering the distillation tower 104, 204. The feed separator may separate a feed stream having a mixed liquid and vapor stream into a liquid stream and a vapor stream. Lines 12 may extend from the feed separator to the distillation tower 104, 204. One of the lines 12 may receive the vapor stream from the feed separator. Another one of the lines 12 may receive the liquid stream from the feed separator. Each of the lines 12 may extend to the same and/or different sections (i.e. middle controlled freeze zone, and lower sections) of the distillation tower 104, 204. The expander device 102 may or may not be downstream of the feed separator 103. The expander device 102 may comprise a plurality of expander devices 102 such that each line 12 has an expander device 102.

The system may include a dehydration unit 261 (FIGS. 3-6). The feed stream 10 may enter the dehydration unit 261 before entering the distillation tower 104, 204. The feed stream 10 enters the dehydration unit 261 before entering the heat exchanger 100 and/or the expander device 102. The dehydration unit 261 removes water from the feed stream 10 to prevent water from later presenting a problem in the heat exchanger 100, expander device 102, feed separator 103, or distillation tower 104, 204. The water can present a problem by forming a separate water phase (i.e., ice and/or hydrate) that plugs lines, equipment or negatively affects the distillation process. The dehydration unit 261 dehydrates the feed stream to a dew point sufficiently low to ensure a separate water phase will not form at any point downstream during the rest of the process. The dehydration unit may be any suitable dehydration mechanism, such as a molecular sieve or a glycol dehydration unit.

The system may include a filtering unit (not shown). The feed stream 10 may enter the filtering unit before entering the distillation tower 104, 204. The filtering unit may remove undesirable contaminants from the feed stream before the feed stream enters the distillation tower 104, 204. Depending on what contaminants are to be removed, the filtering unit may be before or after the dehydration unit 261 and/or before or after the heat exchanger 100.

The systems may include a line 12 (FIGS. 3-6). The line may also be referred to as an inlet channel 12. The feed stream 10 may be introduced into the distillation tower 104, 204 through the line 12. The line 12 may extend to the lower section 106 or the middle controlled freeze zone section 108 of the distillation tower 104, 204. For example, the line 12 may extend to the lower section 106 such that the feed stream 10 may enter the lower section 106 of the distillation tower 104, 204 (FIGS. 3-6). The line 12 may directly or indirectly extend to the lower section 106 or the middle controlled freeze zone section 108. The line 12 may extend to an outer surface of the distillation tower 104, 204 before entering the distillation tower 104, 204.

If the system includes the feed separator 103 (FIGS. 5-6), the line 12 may comprise a plurality of lines 12. Each line may be the same line as one of the lines that extends from the feed separator to a specific portion of the distillation tower 104, 204.

The lower section 106 is constructed and arranged to separate the feed stream 10 into an enriched contaminant bottom liquid stream (i.e., liquid stream) and a freezing zone vapor stream (i.e., vapor stream). The lower section 106 separates the feed stream at a temperature and pressure at which no solids form. The liquid stream may comprise a greater quantity of contaminants than of methane. The vapor stream may comprise a greater quantity of methane than of contaminants. In any case, the vapor stream is lighter than the liquid stream. As a result, the vapor stream rises from the lower section 106 and the liquid stream falls to the bottom of the lower section 106.

The lower section 106 may include and/or connect to equipment that separates the feed stream. The equipment may comprise any suitable equipment for separating methane from contaminants, such as one or more packed sections 181, or one or more distillation trays with perforations, downcomers, and weirs (FIGS. 3-6).

The equipment may include components that apply heat to the stream to form the vapor stream and the liquid stream. For example, the equipment may comprise a first reboiler 112 that applies heat to the stream. The first reboiler 112 may be located outside of the distillation tower 104, 204. The equipment may also comprise a second reboiler 172 that applies heat to the stream. The second reboiler 172 may be located outside of the distillation tower 104, 204. Line 117 may lead from the distillation tower to the second reboiler 172. Line 17 may lead from the second reboiler 172 to the distillation tower. Additional reboilers, set up similarly to the second reboiler described above, may also be used.

The first reboiler 112 may apply heat to the liquid stream that exits the lower section 106 through a liquid outlet 160 of the lower section 106. The liquid stream may travel from the liquid outlet 160 through line 28 to reach the first reboiler 112 (FIGS. 3-6). The amount of heat applied to the liquid stream by the first reboiler 112 can be increased to separate more methane from contaminants. The more heat applied by the reboiler 112 to the stream, the more methane separated from the liquid contaminants, though more contaminants will also be vaporized.

The first reboiler 112 may also apply heat to the stream within the distillation tower 104, 204. Specifically, the heat applied by the first reboiler 112 warms up the lower section 106. This heat travels up the lower section 106 and supplies heat to warm solids entering a melt tray assembly 139 (FIGS. 3-6) of the middle controlled freeze zone section 108 so that the solids form a liquid and/or slurry mix.

The second reboiler 172 applies heat to the stream within the lower section 106. This heat is applied closer to the middle controlled freeze zone section 108 than the heat applied by the first reboiler 112. As a result, the heat applied by the second reboiler 172 reaches the middle controlled freeze zone section 108 faster than the heat applied by the first reboiler 112. The second reboiler 172 also helps with energy integration.

The equipment may include one or more chimney assemblies 135 (FIGS. 3-6). While falling to the bottom of the lower section 106, the liquid stream may encounter one or more of the chimney assemblies 135.

Each chimney assembly 135 includes a chimney tray 131 that collects the liquid stream within the lower section 106. The liquid stream that collects on the chimney tray 131 may be fed to the second reboiler 172. After the liquid stream is heated in the second reboiler 172, the stream may return to the middle controlled freeze zone section 108 to supply heat to the middle controlled freeze zone section 108 and/or the melt tray assembly 139. Unvaporized stream exiting the second reboiler 172 may be fed back to the distillation tower 104, 204 below the chimney tray 131. Vapor stream exiting the second reboiler 172 may be routed under or above the chimney tray 131 when the vapor stream enters the distillation tower 104, 204.

The chimney tray 131 may include one or more chimneys 137. The chimney 137 serves as a channel that the vapor stream in the lower section 106 traverses. The vapor stream travels through an opening in the chimney tray 131 at the bottom of the chimney 137 to the top of the chimney 137. The opening is closer to the bottom of the lower section 106 than it is to the bottom of the middle controlled freeze zone section 108. The top is closer to the bottom of the middle controlled freeze zone section 108 than it is to the bottom of the lower section 106.

Each chimney 137 has attached to it a chimney cap 133. The chimney cap 133 covers a chimney top opening 138 of the chimney 137. The chimney cap 133 prevents the liquid stream from entering the chimney 137. The vapor stream exits the chimney assembly 135 via the chimney top opening 138.

Figure 8:
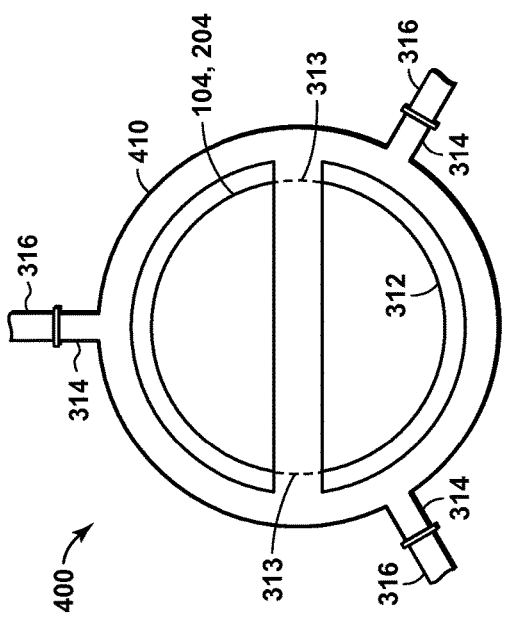
FIG. 8 is a top plan view of a fluid distribution system according to the disclosure.
Figure 9:
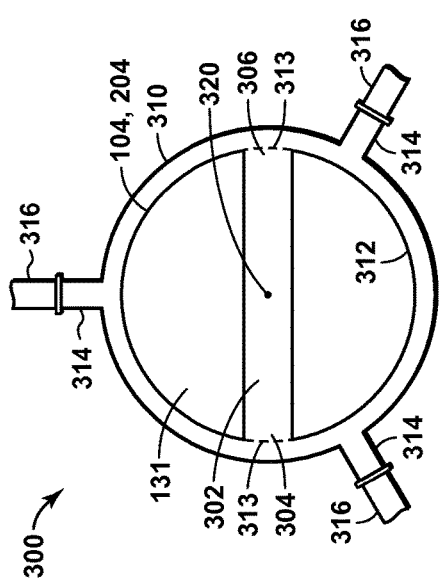
FIG. 9 is a side elevational view of the fluid distribution system shown in FIG. 8.

FIG. 8 is a top plan view of a fluid distribution system 300 according to an aspect of the disclosure. FIG. 9 is a side elevational view of the fluid distribution system 300 shown in FIG. 8. FIGS. 8-9 show a fluid distribution system 300 according to an aspect of the disclosure. The fluid distribution system 300 may include a collection trough 302 into which liquid on the chimney tray 131 is collected. The collection trough 302 is shown as having two ends 304 and 306 disposed at proximal and distal ends of the collection trough 302 and extending substantially across the inner diameter of the distillation tower 104, 204. A sump 308, shown as an annular surface or ledge, may be disposed at a slightly lower elevation than the elevation of the collection trough 302 in some embodiments to aid flowing liquid in the collection trough into the sump 308. An annular fluid distribution belt 310 is disposed along an inner circumference of the outer wall 312 of the distillation tower 104, 204. The fluid distribution belt 310 is shown in FIGS. 8-9 as having a semi-circular or half-pipe cross-section along an outer circumference. The fluid distribution belt 310 may be positioned no higher than the elevation of the sump 308. One or more outlets or holes 313 are cut or drilled through the outer wall 312 of the distillation tower 104, 204 to permit liquid in the sump 308 to flow into the fluid distribution belt 310. At least two outlet nozzles 314 are attached to the fluid distribution belt 310. Downcomer lines 316, which may include tubing or piping, or partially enclosed fluid passages, are connected to the outlet nozzles 314. The number of outlet nozzles 314 used in system 300 may be varied to accommodate the number of downcomer lines 316. This number is typically more than two with a maximum number limited by mechanical strength considerations of the fluid distribution belt 310.

The locations of the outlet nozzles 314 around the fluid distribution belt 310 are chosen to distribute liquid flow evenly between the outlet nozzles. Furthermore, the locations of the outlet nozzles 314 around the fluid distribution belt 310 preferably do not coincide with the locations of the holes or openings 313 that permit fluid to flow from the sump 308 into the fluid distribution belt 310. Additionally, the centerline 318 of the fluid distribution belt 310 may coincide with the center axis 320 of the outlet nozzles 314.

Figure 10:
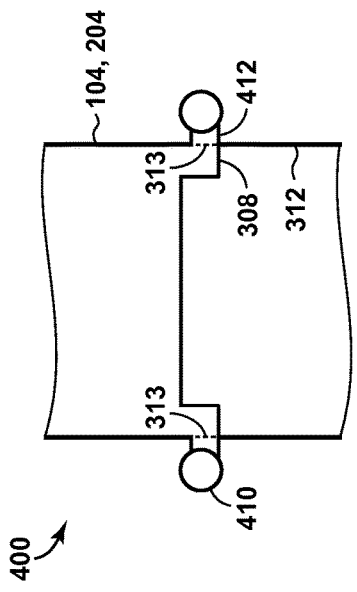
FIG. 10 is a top plan view of another fluid distribution system according to the disclosure.
Figure 11:
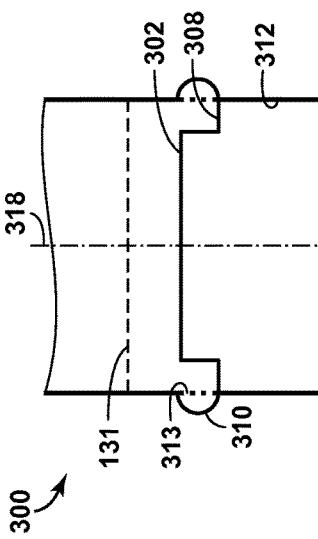
FIG. 11 is a side elevational view of the fluid distribution system shown in FIG. 10.

FIG. 10 is a top plan view of a fluid distribution system 400 according to the disclosure. FIG. 11 is a side elevational view of the fluid distribution system 400 shown in FIG. 10. The components of the fluid distribution system 400 may be the same as the components of the fluid distribution system 300 of FIGS. 8-9 except as otherwise noted. FIGS. 10-11 show another aspect of the disclosure in which a system 400 includes a fluid distribution belt 410 that is not integral with the distillation tower 104, 204. As shown, the fluid distribution system 400 is at least partially disposed outside of an outer wall 312 of the tower 104, 204. The fluid distribution belt 410 is depicted as having a generally circular cross-section and is connected to the sump 308 via a short pipe segment or segments 412. Alternatively, the fluid distribution belt 410 may be arranged at a lower elevation along the distillation tower 104, 204. The system 400 is otherwise constructed and operates substantially similar to sytem 300. For example, a plurality of outlet nozzles 314 are disposed in the fluid distribution belt 410 to accommodate the number of required independent downcomer lines 316. The number of outlet nozzles 314 is typically more than two with a maximum number limited by mechanical strength considerations of the fluid distribution belt 410.

Figure 12:
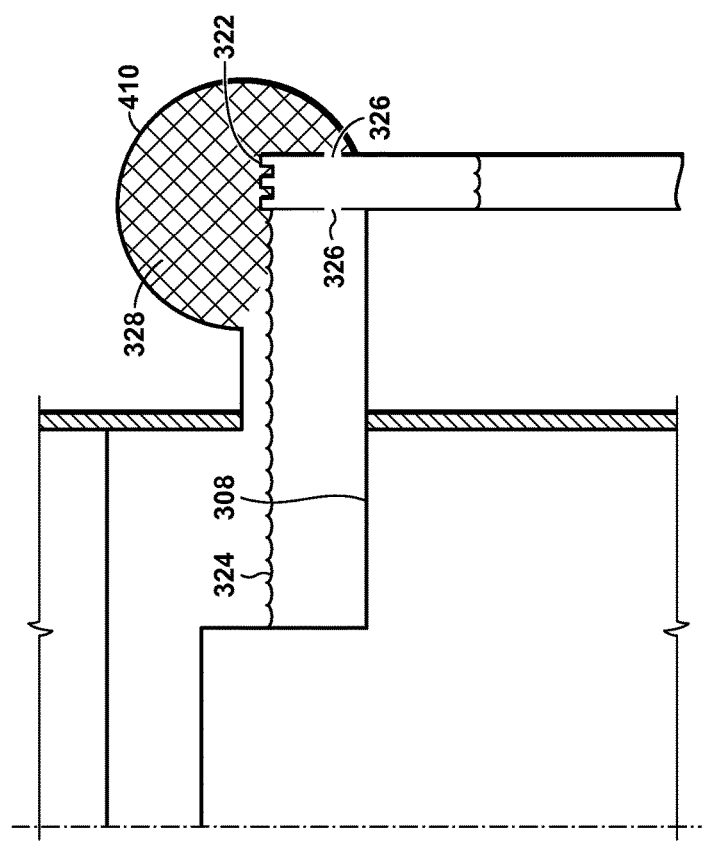
FIG. 12 is a detail view of the fluid distribution system shown in FIGS. 10-11.

Optimal operability of downstream equipment requires equal distribution of the liquid flowing into the multiple, independent downcomer lines. The design of the systems disclosed herein must assure this equal distribution as it transfers liquid from the chimney tray 131 to the downcomer lines 316. According to aspects disclosed herein, means are provided to achieve and maintain equal distribution of liquid among the downcomer lines 316. FIG. 12 is a detail view of part of the system 300, 400 shown in FIGS. 8-11. Although fluid distribution belt 410 of system 400 (FIGS. 10-11) is depicted in FIG. 12, the aspects disclosed in FIG. 12 may also apply to fluid distribution belt 310 of system 300 (FIGS. 8-9). The top end 322 of each downcomer line 316 extends a certain vertical distance upwardly into the fluid distribution belt 410. Liquid 324 collects in the sump 308 until it is higher than the top end 322 of the downcomer line 316. This collected liquid establishes uniform flow of liquid into the downcomer line 316, and also ensures a constant liquid pressure or head within the fluid distribution belt 410. The top end 322 of the downcomer line 316 may have a textured surface, e.g., having notches, scallops, grooves, castellations, etc., as shown in FIG. 12, to facilitate entry of liquid into the downcomer line. Start-up notches, spouts, or holes 326 may be disposed in the downcomer line 316 where the downcomer line enters the inside of the fluid distribution belt 410. The start-up holes 326 initiate the beginning of uniform liquid flow into the downcomer line 316 until such time as the level of liquid 324 reaches the top end 322 of the downcomer line. The startup holes 326 encourage a full and even liquid flow to all downcomer lines. Additionally, packing 328 may be placed inside the fluid distribution belt 410 and/or in the sump 308 to act as a calming agent for the liquid 324, as unsteady, turbulent liquid flow would contribute to uneven liquid distribution to the downcomer lines 316.

Figure 13:
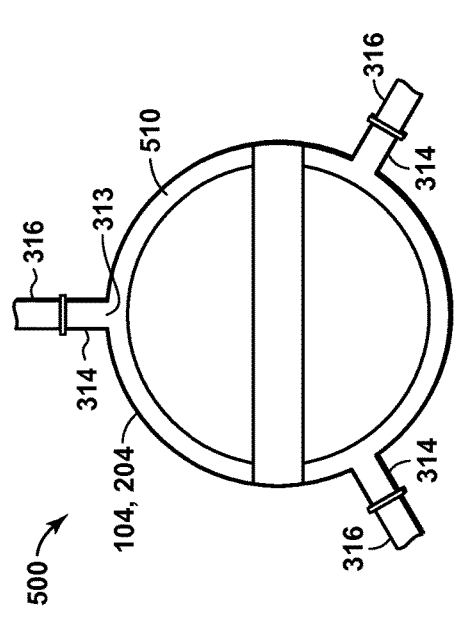
FIG. 13 is a top plan view of another fluid distribution system according to the disclosure.
Figure 14:
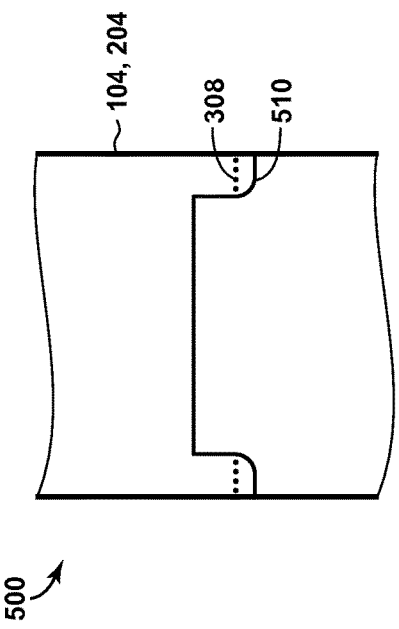
FIG. 14 is a side elevational view of the fluid distribution system shown in FIG. 13.

FIGS. 13-14 disclose another aspect of the disclosure in which a system 500 includes a fluid distribution belt 510 disposed internal to the distillation tower 104, 204, and may be disposed around the inner circumference of the distillation tower 104, 204. The fluid distribution belt 510 is positioned to be in fluid connection with the sump 308. A plurality of outlet nozzles 314 are placed on the outer wall of the distillation tower 104, 204, and a plurality of holes (not shown) are cut or drilled through the outer wall so that liquid in the fluid distribution belt 510 flows through the holes into the outlet nozzles. Packing 328 may be placed inside the fluid distribution belt 510 and/or in the sump 308 to act as a calming agent for the liquid contained therein. The design of fluid distribution belt 510 provides uniform flow to multiple, independent downcomer pipe lines and resembles the designs of the fluid distribution belts 310, 410.

Returning to the description of FIGS. 3-6, after falling to the bottom of the lower section 106, the liquid stream exits the distillation tower 104, 204 through the liquid outlet 160. The liquid outlet 160 is within the lower section 106 (FIGS. 3-6). The liquid outlet 160 may be located at the bottom of the lower section 106.

After exiting through the liquid outlet 160, the feed stream may travel via line 28 to the first reboiler 112. The feed stream may be heated by the first reboiler 112 and vapor may then re-enter the lower section 106 through line 30. Unvaporized liquid may continue out of the distillation process via line 24.

The system may include an expander device 114 (FIGS. 3-6). After entering line 24, the heated liquid stream may be expanded in the expander device 114. The expander device 114 may be any suitable device, such as a valve. The valve 114 may be any suitable valve, such as a J-T valve.

The system may include a heat exchanger 116 (FIGS. 3-6). The liquid stream heated by the first reboiler 112 may be cooled or heated by the heat exchanger 116. The heat exchanger 116 may be a direct heat exchanger or an indirect heat exchanger. The heat exchanger 116 may comprise any suitable heat exchanger and may include a line 26 for an output stream.

The vapor stream in the lower section 106 rises from the lower section 106 to the middle controlled freeze zone section 108. The middle controlled freeze zone section 108 is maintained to receive a freezing zone liquid stream to form the solid and the vapor stream (i.e., hydrocarbon-enriched vapor stream) in the middle controlled freeze zone section 108. The middle controlled freeze zone section 108 is constructed and arranged to separate the feed stream 10 introduced into the middle controlled freeze zone section into a solid and a vapor stream. The solid and the vapor stream are formed in the middle controlled freeze zone section 108 when the freezing zone liquid stream is injected into the middle controlled freeze zone section 108 at a temperature and pressure at which the solid and vapor stream form. The solid may be comprised more of contaminants than of methane. The vapor stream may comprise more methane than contaminants.

Figure 7:
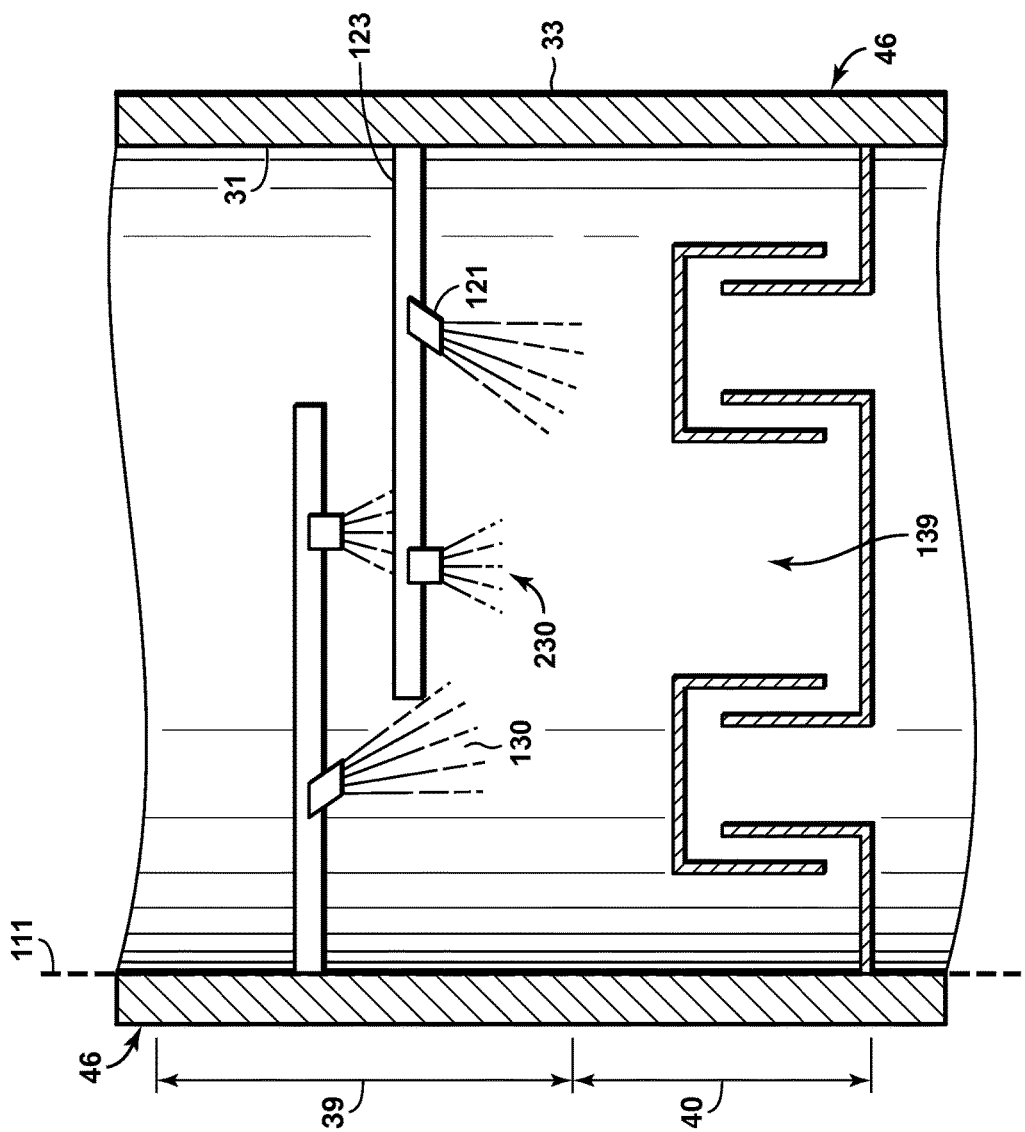
FIG. 7 is a side elevational view of another portion of the distillation column or tower.

The middle controlled freeze zone section 108 includes a lower section 40 and an upper section 39 (FIG. 7). The lower section 40 is below the upper section 39. The lower section 40 directly abuts the upper section 39. The lower section 40 is primarily but may not exclusively be a heating section of the middle controlled freeze zone section 108. The upper section 39 is primarily but may not exclusively be a cooling section of the middle controlled freeze zone section 108. The temperature and pressure of the upper section 39 are chosen so that the solid can form in the middle controlled freeze zone section 108.

The middle controlled freeze zone section 108 may comprise a melt tray assembly 139 that is maintained in the middle controlled freeze zone section 108 (FIGS. 3-7). The melt tray assembly 139 is within the lower section 40 of the middle controlled freeze zone section 108. The melt tray assembly 139 is not within the upper section 39 of the middle controlled freeze zone section 108.

The melt tray assembly 139 is constructed and arranged to melt a solid formed in the middle controlled freeze zone section 108. When the warm vapor stream rises from the lower section 106 to the middle controlled freeze zone section 108, the vapor stream immediately encounters the melt tray assembly 139 and supplies heat to melt the solid. The melt tray assembly 139 may comprise at least one of a melt tray 118, a bubble cap 132, a liquid 130 and heat mechanism(s) 134.

The melt tray 118 may collect a liquid and/or slurry mix. The melt tray 118 divides at least a portion of the middle controlled freeze zone section 108 from the lower section 106. The melt tray 118 is at the bottom 45 of the middle controlled freeze zone section 108.

One or more bubble caps 132 may act as a channel for the vapor stream rising from the lower section 106 to the middle controlled freeze zone section 108. The bubble cap 132 may provide a path for the vapor stream that forces the vapor stream up the riser 140 and then down and around the riser 140 to the melt tray 118. The riser 140 is covered by a cap 141. The cap 141 prevents the liquid 130 from travelling into the riser 140. The cap 141 helps prevent solids from travelling into the riser 140. The vapor stream's traversal through the bubble cap 132 allows the vapor stream to transfer heat to the liquid 130 within the melt tray assembly 139.

One or more heat mechanisms 134 may further heat up the liquid 130 to facilitate melting of the solids into a liquid and/or slurry mix. The heat mechanism(s) 134 may be located anywhere within the melt tray assembly 139. For example, as shown in FIGS. 3-6, a heat mechanism 134 may be located around the bubble caps 132. The heat mechanism 134 may be any suitable mechanism, such as a heat coil. The heat source of the heat mechanism 134 may be any suitable heat source.

The liquid 130 in the melt tray assembly is heated by the vapor stream. The liquid 130 may also be heated by the one or more heat mechanisms 134. The liquid 130 helps melt the solids formed in the middle controlled freeze zone section 108 into a liquid and/or slurry mix. Specifically, the heat transferred by the vapor stream heats up the liquid, thereby enabling the heat to melt the solids. The liquid 130 is at a level sufficient to melt the solids.

The middle controlled freeze zone section 108 may also comprise a spray assembly 129. The spray assembly 129 cools the vapor stream that rises from the lower section 40. The spray assembly 129 sprays liquid, which is cooler than the vapor stream, on the vapor stream to cool the vapor stream. The spray assembly 129 is within the upper section 39. The spray assembly 129 is not within the lower section 40. The spray assembly 129 is above the melt tray assembly 139. In other words, the melt tray assembly 139 is below the spray assembly 129.

The temperature in the middle controlled freeze zone section 108 cools down as the vapor stream travels from the bottom of the middle controlled freeze zone section 108 to the top of the middle controlled freeze zone section 108. The methane in the vapor stream rises from the middle controlled freeze zone section 108 to the upper section 110. Some contaminants may remain in the methane and also rise. The contaminants in the vapor stream tend to condense or solidify with the colder temperatures and fall to the bottom of the middle controlled freeze zone section 108.

The solids form the liquid and/or slurry mix when in the liquid 130. The liquid and/or slurry mix flows from the middle controlled freeze zone section 108 to the lower distillation section 106. The liquid and/or slurry mix flows from the bottom of the middle controlled freeze zone section 108 to the top of the lower section 106 via a line 22 (FIGS. 3-6). The line 22 may be an exterior line. The line 22 may extend from the distillation tower 104, 204. The line 22 may extend from the middle controlled freeze zone section 108. The line may extend to the lower section 106.

The vapor stream that rises in the middle controlled freeze zone section 108 and does not form solids or otherwise fall to the bottom of the middle controlled freeze zone section 108, rises to the upper section 110. The upper section 110 operates at a temperature and pressure and contaminant concentration at which no solid forms. The upper section 110 is constructed and arranged to cool the vapor stream to separate the methane from the contaminants Reflux in the upper section 110 cools the vapor stream. The reflux is introduced into the upper section 110 via line 18. Line 18 may extend to the upper section 110. Line 18 may extend from an outer surface of the distillation tower 104, 204.

After contacting the reflux in the upper section 110, the feed stream forms a vapor stream and a liquid stream. The vapor stream mainly comprises methane. The liquid stream comprises relatively more contaminants. The vapor stream rises in the upper section 110 and the liquid falls to a bottom of the upper section 110.

To facilitate separation of the methane from the contaminants when the stream contacts the reflux, the upper section 110 may include one or more mass transfer devices 176. Each mass transfer device 176 helps separate the methane from the contaminants. Each mass transfer device 176 may comprise any suitable separation device, such as a tray with perforations, or a section of random or structured packing to facilitate contact of the vapor and liquid phases.

After rising, the vapor stream may exit the distillation tower 104, 204 through line 14. The line 14 may emanate from an upper part of the upper section 110. The line 14 may extend from an outer surface of the upper section 110.

From line 14, the vapor stream may enter a condenser 122. The condenser 122 cools the vapor stream to form a cooled stream. The condenser 122 at least partially condenses the stream.

After exiting the condenser 122, the cooled stream may enter a separator 124. The separator 124 separates the vapor stream into liquid and vapor streams. The separator may be any suitable separator that can separate a stream into liquid and vapor streams, such as a reflux drum.

Once separated, the vapor stream may exit the separator 124 as sales product. The sales product may travel through line 16 for subsequent sale to a pipeline and/or condensation to be liquefied natural gas.

Once separated, the liquid stream may return to the upper section 110 through line 18 as the reflux. The reflux may travel to the upper section 110 via any suitable mechanism, such as a reflux pump 150 (FIGS. 3 and 5) or gravity (FIGS. 4 and 6).

The liquid stream (e.g., the freezing zone liquid stream) that falls to the bottom of the upper section 110 collects at the bottom of the upper section 110. The liquid may collect on tray 183 (FIGS. 3 and 5) or at the bottommost portion of the upper section 110 (FIGS. 4 and 6). The collected liquid may exit the distillation tower 104, 204 through line 20 (FIGS. 3 and 5) or outlet 260 (FIGS. 4 and 6). The line 20 may emanate from the upper section 110. The line 20 may emanate from a bottom end of the upper section 110. The line 20 may extend from an outer surface of the upper section 110.

The line 20 and/or outlet 260 connect to a line 41. The line 41 leads to the spray assembly 129 in the middle controlled freeze zone section 108. The line 41 emanates from the holding vessel 126. The line 41 may extend to an outer surface of the middle controlled freeze zone section 108.

The line 20 and/or outlet 260 may directly or indirectly (FIGS. 3-6) connect to the line 41. When the line 20 and/or outlet 260 directly connect to the line 41, the liquid spray may be pumped to the spray nozzle(s) 120 via any suitable mechanism, such as the spray pump 128 or gravity. When the line 20 and/or outlet 260 indirectly connect to the line 41, the lines 20, 41 and/or outlet 260 and line 41 may directly connect to a holding vessel 126 (FIGS. 3 and 5). The holding vessel 126 may house at least some of the liquid spray before it is sprayed by the nozzle(s). The liquid spray may be pumped from the holding vessel 126 to the spray nozzle(s) 120 via any suitable mechanism, such as the spray pump 128 (FIGS. 3-6) or gravity. The holding vessel 126 may be needed when there is not a sufficient amount of liquid stream at the bottom of the upper section 110 to feed the spray nozzles 120.

Figure 15:
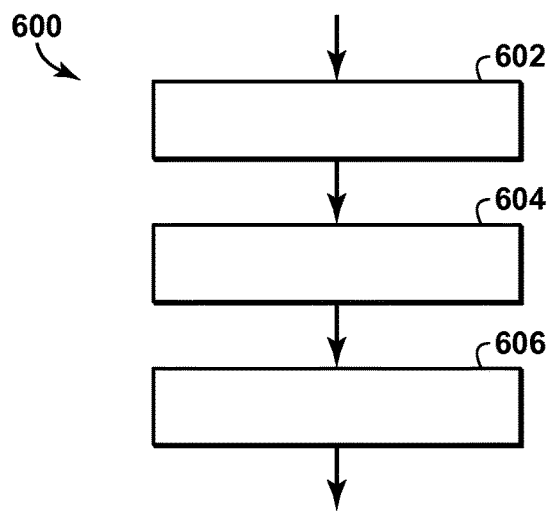
FIG. 15 is a flowchart of a method according to the disclosure.

FIG. 15 is a flowchart showing a method 600 for maintaining constant fluid pressure and equalized fluid flow among a plurality of downcomer lines through which liquid from a substantially cylindrical tower, e.g., the distillation tower 104, 204 of FIGS. 3-6, is directed. At block 602 a substantially annular fluid distribution belt is disposed at the circumference of the tower. At block 604 liquid from the tower is collected in the fluid distribution belt. At block 606 the liquid is directed from the fluid distribution belt out of the tower and into a corresponding number of downcomer lines disposed external to the tower separating a feed stream in a tower.

Figure 16:
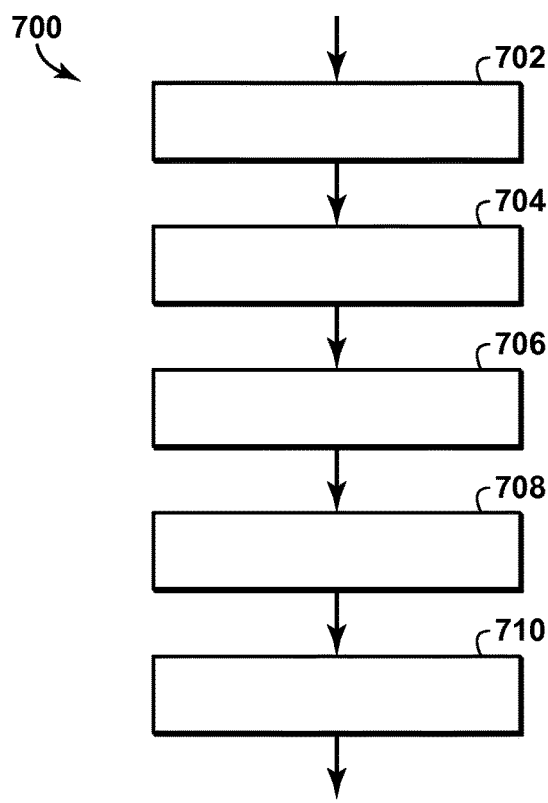
FIG. 16 is a flowchart of another method according to the disclosure.

FIG. 16 is a flowchart showing a method 700 for producing and/or processing hydrocarbons. At block 702 constant fluid pressure and equalized fluid flow is maintained among a plurality of downcomer lines through which liquid from a hydrocarbon tower is directed. At block 704 a substantially annular fluid distribution belt is disposed at the circumference of the tower. At block 706 liquid from the tower is collected in the fluid distribution belt. At block 708 liquid is directed from the fluid distribution belt out of the tower and into a corresponding number of downcomer lines disposed external to the tower. At block 710 hydrocarbons from the tower are produced.

The steps depicted in FIGS. 15 and 16 are provided for illustrative purposes only and a particular step may not be required to perform the inventive methodology. Moreover, FIGS. 15 and 16 may not illustrate all the steps that may be performed. The claims, and only the claims, define the inventive system and methodology.

Disclosed aspects may be used in hydrocarbon management activities. As used herein, "hydrocarbon management" or "managing hydrocarbons" includes hydrocarbon extraction, hydrocarbon production, hydrocarbon exploration, identifying potential hydrocarbon resources, identifying well locations, determining well injection and/or extraction rates, identifying reservoir connectivity, acquiring, disposing of and/ or abandoning hydrocarbon resources, reviewing prior hydrocarbon management decisions, and any other hydrocarbon-related acts or activities. The term "hydrocarbon management" is also used for the injection or storage of hydrocarbons or $CO_2$, for example the sequestration of $CO_2$, such as reservoir evaluation, development planning, and reservoir management. The disclosed methodologies and techniques may be used in extracting hydrocarbons from a subsurface region and processing the hydrocarbons. Hydrocarbons and contaminants may be extracted from a reservoir and processed. The hydrocarbons and contaminants may be processed, for example, in the distillation tower previously described. After the hydrocarbons and contaminants are processed, the hydrocarbons may be extracted from the processor, such as the distillation tower, and produced. The contaminants may be discharged into the Earth, etc. For example, as shown in FIG. 16, the method for producing hydrocarbons may include producing the hydrocarbon-enriched vapor stream extracted from the tower. The method may also include removing the hydrocarbon-enriched vapor stream from the tower before producing the hydrocarbon-enriched vapor stream. The initial hydrocarbon extraction from the reservoir may be accomplished by drilling a well using hydrocarbon drilling equipment. The equipment and techniques used to drill a well and/or extract these hydrocarbons are well known by those skilled in the relevant art. Other hydrocarbon extraction activities and, more generally, other hydrocarbon management activities, may be performed according to known principles.

As utilized herein , the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numeral ranges provided. Accordingly, these terms should be interpreted as indicating that insubstantial or inconsequential modifications or alterations of the subject matter described and are considered to be within the scope of the disclosure. Furthermore, the articles "the," "a" and "an" are not necessarily limited to mean only one, but rather are inclusive and open ended so as to include, optionally, multiple such elements.

It should be understood that the numerous changes, modifications, and alternatives to the preceding disclosure can be made without departing from the scope of the disclosure. The preceding description, therefore, is not meant to limit the scope of the disclosure.

Rather, the scope of the disclosure is to be determined only by the appended claims and their equivalents. It is also contemplated that structures and features in the present examples can be altered, rearranged, substituted, deleted, duplicated, combined, or added to each other.

What is claimed is:

1. An apparatus for maintaining constant fluid pressure and equalized fluid flow among a plurality of downcomer lines through which liquid from a substantially cylindrical tower is directed, comprising:
   a substantially annular fluid distribution belt positioned about a circumference of the tower, the fluid distribution belt collecting liquid from the tower;
   at least two outlets configured to direct liquid from the fluid distribution belt into a corresponding number of downcomer lines disposed external to the tower; and
   a textured surface on a top end of each of the downcomer lines.

2. The apparatus of claim 1, wherein the fluid distribution belt is at least partially disposed outside of an outer wall of the tower, and further comprising a plurality of openings in the outer wall of the tower through which liquid collected inside the tower flows into the fluid distribution belt.

3. The apparatus of claim 2, wherein the plurality of openings are disposed around the fluid distribution belt at different positions from the at least two outlets.

4. The apparatus of claim 1, wherein the fluid distribution belt is at least partially disposed outside of an outer wall of the tower.

5. The apparatus of claim 1, wherein the fluid distribution belt has a cross-section that is substantially semi-circular.

6. The apparatus of claim 1, wherein the fluid distribution belt has a cross-section that is at least substantially circular along an outer circumference.

7. The apparatus of claim 1, comprising at least three outlets.

8. The apparatus of claim 1, wherein an end of each downcomer line extends upwardly into the fluid distribution belt.

9. The apparatus of claim 1, wherein the textured surface comprises one of notches, scallops, grooves, and castellations.

10. The apparatus of claim 1, wherein the fluid distribution belt is disposed at least partially internal to the tower, and wherein the at least two outlets are in fluid communication with the fluid distribution belt via openings in an outer wall of the tower.

11. The apparatus of claim 1, further comprising packing placed inside the fluid distribution belt, the packing as a calming agent for liquid in the fluid distribution belt.

12. An apparatus for maintaining constant fluid pressure and equalized fluid flow among a plurality of downcomer lines through which liquid from a substantially cylindrical tower is directed, comprising:
  a substantially annular fluid distribution belt positioned about a circumference of the tower, the fluid distribution belt collecting liquid from the tower;
  at least two outlets configured to direct liquid from the fluid distribution belt into a corresponding number of downcomer lines disposed external to the tower; and
  at least one opening in each downcomer line at an elevation that is below a top end of said each downcomer line and within the fluid distribution belt, whereby liquid collected in the tower begins to flow through the at least one opening before reaching said top end of said each downcomer line.

13. A method of maintaining constant fluid pressure and equalized fluid flow among a plurality of downcomer lines through which liquid from a substantially cylindrical tower is directed, performed in an apparatus according to claim 1, the method comprising:
  collecting liquid from the tower at the substantially annular fluid distribution belt positioned at the circumference of the tower; and
  passing liquid from the fluid distribution belt out of the tower and into the corresponding number of downcomer lines disposed external to the tower.

14. The method of claim 13, wherein the fluid distribution belt is disposed at least partially external to the tower.

15. The method of claim 13, wherein the fluid distribution belt is disposed at least partially integral with the tower.

16. The method of claim 13, further comprising:
  maintaining a level of liquid in the fluid distribution belt sufficient to melt solids.

17. The method of claim 13, wherein the fluid distribution belt is at least partially internal to the tower.

18. A method of producing hydrocarbons performed in an apparatus of claim 1, the method comprising:
  maintaining constant fluid pressure and equalized fluid flow among the plurality of downcomer lines through which liquid from the substantially cylindrical tower is directed;
  collecting liquid from the tower in the substantially annular fluid distribution belt positioned at the circumference of the tower;
  passing liquid from the fluid distribution belt out of tower and into the corresponding number of downcorner lines external to the tower; and
  passing hydrocarbons from the tower.

* * * * *